(12) United States Patent
Chen

(10) Patent No.: US 10,264,858 B2
(45) Date of Patent: Apr. 23, 2019

(54) WATERPROOF ZIPPER AND PROCESS OF MANUFACTURING SAME

(71) Applicant: Hung-Chao Chen, Kaohsiung (TW)

(72) Inventor: Hung-Chao Chen, Kaohsiung (TW)

(73) Assignee: Win-Chain Knitting Co., Ltd., Kaohsiung (TW)

( * ) Notice: Subject to any disclaimer, the term of this patent is extended or adjusted under 35 U.S.C. 154(b) by 181 days.

(21) Appl. No.: 15/247,942

(22) Filed: Aug. 26, 2016

(65) Prior Publication Data

US 2016/0360840 A1  Dec. 15, 2016

(51) Int. Cl.
| | |
|---|---|
| A44B 19/32 | (2006.01) |
| A44B 19/02 | (2006.01) |
| A44B 19/42 | (2006.01) |
| B29C 65/18 | (2006.01) |
| B32B 37/00 | (2006.01) |
| B29K 75/00 | (2006.01) |
| B29L 5/00 | (2006.01) |
| B32B 38/10 | (2006.01) |

(52) U.S. Cl.
CPC .............. *A44B 19/32* (2013.01); *A44B 19/02* (2013.01); *A44B 19/42* (2013.01); *B29C 65/18* (2013.01); *B29K 2075/00* (2013.01); *B29K 2995/0069* (2013.01); *B29L 2005/00* (2013.01); *B32B 37/025* (2013.01); *B32B 38/10* (2013.01); *B32B 2309/12* (2013.01)

(58) Field of Classification Search
CPC ............................ A44B 19/32; Y10T 24/2514
USPC .......................................................... 24/389
See application file for complete search history.

(56) References Cited

U.S. PATENT DOCUMENTS

| | | | | |
|---|---|---|---|---|
| 6,105,214 A * | 8/2000 | Press | ...................... | A44B 19/32 24/389 |
| 6,427,294 B1 * | 8/2002 | Shibaike | ................ | A44B 19/32 24/381 |
| 7,954,209 B2 * | 6/2011 | Chen | ...................... | A44B 19/32 24/389 |
| 8,166,619 B2 * | 5/2012 | Cossutti | ................ | A44B 19/32 24/389 |
| 8,327,509 B2 * | 12/2012 | Kusayama | ............ | A44B 19/32 24/389 |
| 9,642,420 B2 * | 5/2017 | McLachlan | ............... | A41F 1/00 |
| 2004/0237266 A1 * | 12/2004 | Wang | ..................... | A44B 19/32 24/389 |
| 2007/0094852 A1 * | 5/2007 | Wang | ..................... | A44B 19/32 24/389 |
| 2009/0165265 A1 | 7/2009 | Chen | | |
| 2013/0014355 A1 * | 1/2013 | Lee | ........................ | A44B 19/32 24/389 |

(Continued)

*Primary Examiner* — Joshua T Kennedy
(74) *Attorney, Agent, or Firm* — Wang Law Firm, Inc.

(57) ABSTRACT

A waterproof zipper is provided with two halves, each including a half tape member and a row of protruding teeth along an inner edge of the half tape member; and a waterproof layer is secured to an inner surface of the halves. A process of manufacturing the waterproof zipper is also provided, including the steps of: (a) guiding the waterproof layer to a position above the two halves on a continuous flow production line, each half having a half tape member and a row of protruding teeth along an inner edge of the half tape member; (b) coating a waterproof layer on a releasing layer; (c) drying both the waterproof layer and the releasing layer in an oven.

2 Claims, 6 Drawing Sheets

(56) References Cited

U.S. PATENT DOCUMENTS

2018/0055155 A1\* 3/2018 Chen ...................... A44B 19/42
2018/0078007 A1\* 3/2018 Nunnata ................ A44B 19/32

\* cited by examiner

WATERPROOF ZIPPER AND PROCESS OF MANUFACTURING SAME

BACKGROUND OF THE INVENTION

1. Field of the Invention

The invention relates to waterproof zippers and more particularly to a waterproof zipper and a process of manufacturing same.

2. Description of Related Art

As shown in FIGS. 1 to 3B, U.S. Pat. No. 7,954,209 to Chen entitled "waterproof structure for zippers" discloses a half-finished zipper 1 including a tape 10 and two toothed bars 11 secured to two inner edges of the open tape 10 respectively. One toothed bar 11 has teeth 110 adapted to secure to the teeth 110 of the other toothed bar 11 for closing the zipper.

Each tape 10 has an inner surface coated with bonding glue 20. An electroplating membrane 21 is secured to an inner surface of the bonding glue 20 to form a waterproof layer 2 on an inner surface of the tape 10 for preventing water from seeping in the tape 10. The electroplating membrane 21 is provided with a substratum layer 210 made of high molecule polyester, an interface layer 211 made of a dissociating agent and coated on the substratum layer 210, a first protecting colloid layer 212 formed on the interface layer 211, metal powder (e.g., aluminum powder) electroplated on the first protecting colloid layer 212 to form an electroplated layer 213, and a second protecting colloid layer 214 coated on the electroplated layer 213 to finish the electroplating membrane 21.

As illustrated in FIGS. 3A and 3B, steps of forming the waterproof layer 2 on the inner surface of the tape 10 of the half-finished zipper 1 are described in detail below.

A first step is inputting material. The half-finished zipper 1 is guided to a processing line to be processed.

A second step is coating of bonding glue. The bonding glue 20 is evenly coated on the inner surface of the tape 10 of the half-finished zipper 1 by means of a roller unit.

A third step is gluing of electroplating membrane. The electroplating membrane 21 has both the interface layer 211 and the substratum layer 210 removed and then has the first protecting colloid layer 212 bonded with the bonding glue 20 on the inner surface of the tape 10.

A fourth step is drying. The half-finished zipper 1 having its surface coated with the bonding glue 20 and electroplating membrane 21 is conveyed to an oven to be heated for drying the bonding glue 20 and the electroplating membrane 21. The drying time of the oven is set in accordance with the amount of the bonding glue 20 coated on the surface of the tape 10.

A fifth step is hot pressing and shaping. The bonding glue 20 and the electroplating membrane 21 on the surface of the tape 10 of the half-finished zipper 1 are pressed by a hot-pressing device for bonding them together and shaping them.

A sixth step is drying. After the bonding glue 20 and the electroplating membrane 21 on the surface of the half-finished zipper 1 are pressed by the hot-pressing device, the half-finished zipper 1 is conveyed to the oven to be dried again.

A seventh step is keeping cool for curing. The half-finished zipper 1 is cooled off by a fan or by wind and then kept cool to let the bonding glue 20 thereon have sufficient time to be cured for securing the tape 10 to the electroplating membrane 21.

An eighth step is removing the product. After the waterproof layer is formed on the surface of the tape 10, a zipper is formed and removed from the continuous flow production line.

However, steps of the manufacturing process are complicated. Further, the thickness of the zipper is relatively high and the zipper is not sufficiently flexible.

Thus, the need for improvement still exists.

SUMMARY OF THE INVENTION

It is therefore one object of the invention to provide a waterproof zipper comprising two halves, each including a half tape member and a row of protruding teeth along an inner edge of the half tape member; and a waterproof layer is secured to an inner surface of the halves.

The above and other objects, features and advantages of the invention will become apparent from the following detailed description taken with the accompanying drawings.

DETAILED DESCRIPTION OF THE INVENTION

Figure 1:
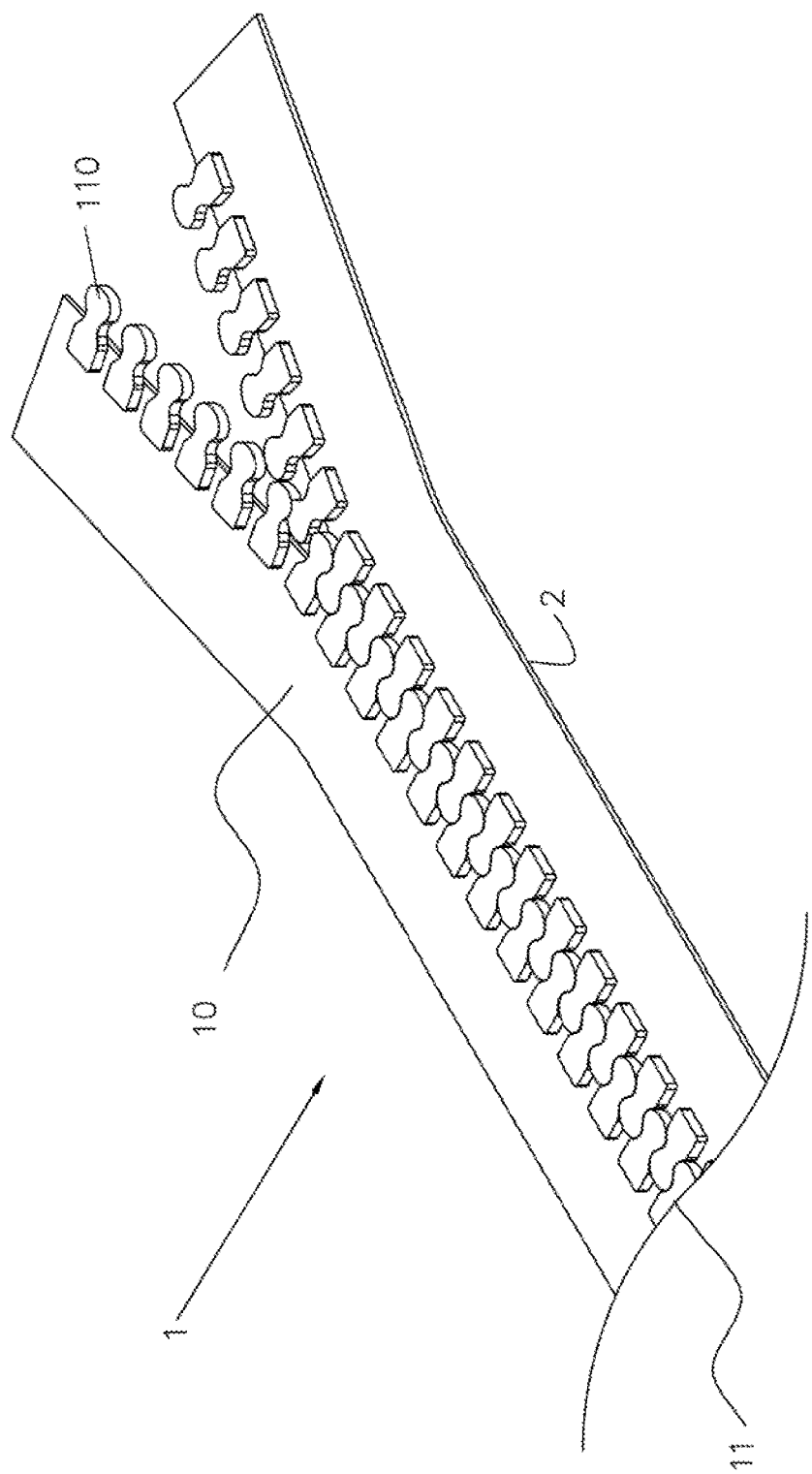
FIG. 1 is a perspective view of a conventional zipper with a waterproof structure.
Figure 2:
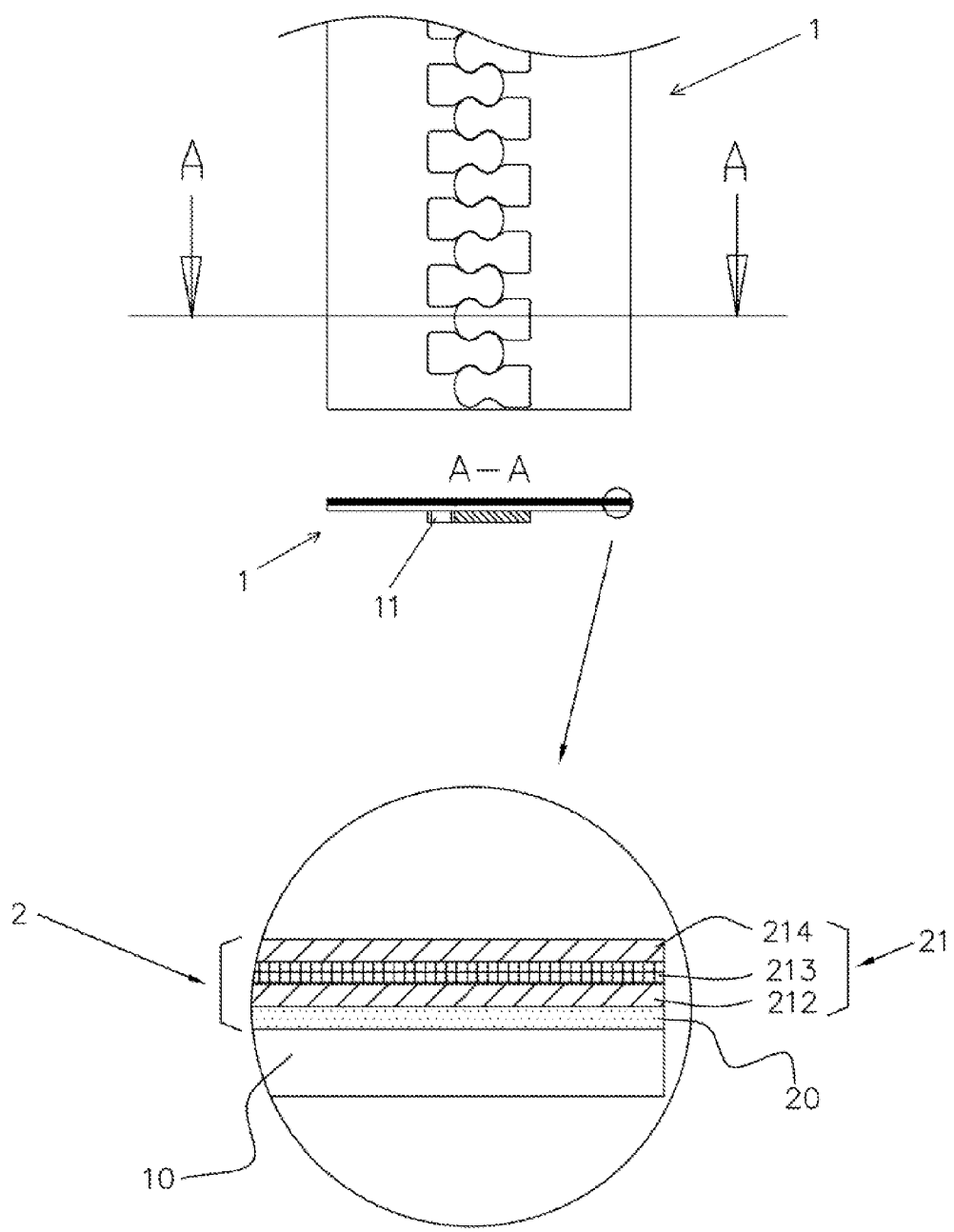
FIG. 2 is a partial cross-sectional view of the waterproof layer of the conventional zipper shown in FIG. 1.
Figure 3A:
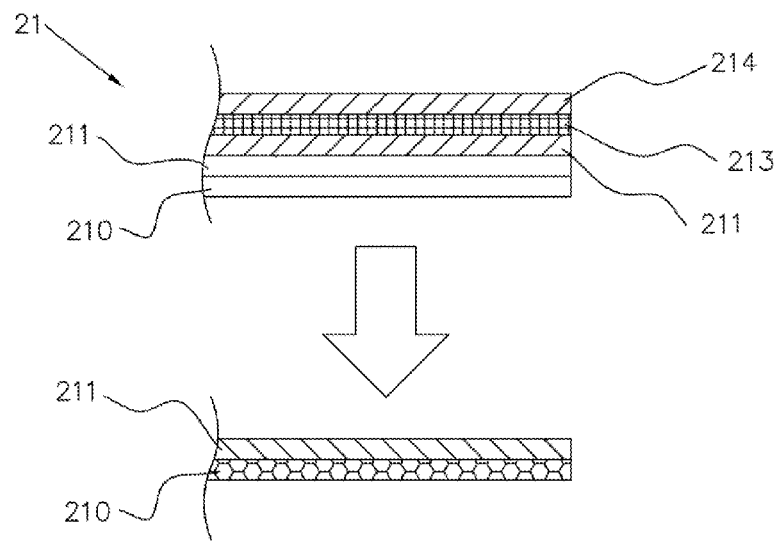
FIG. 3A is a cross-sectional view of the steps of sticking an electroplating membrane to the tape of the conventional zipper.
Figure 3B:
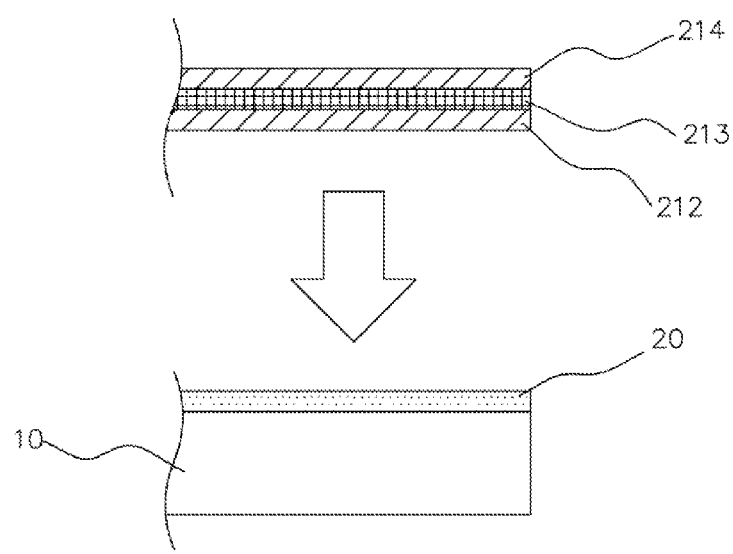
FIG. 3B is another cross-sectional view of the electroplating membrane to be bonded on the tape of the conventional zipper.
Figure 4:
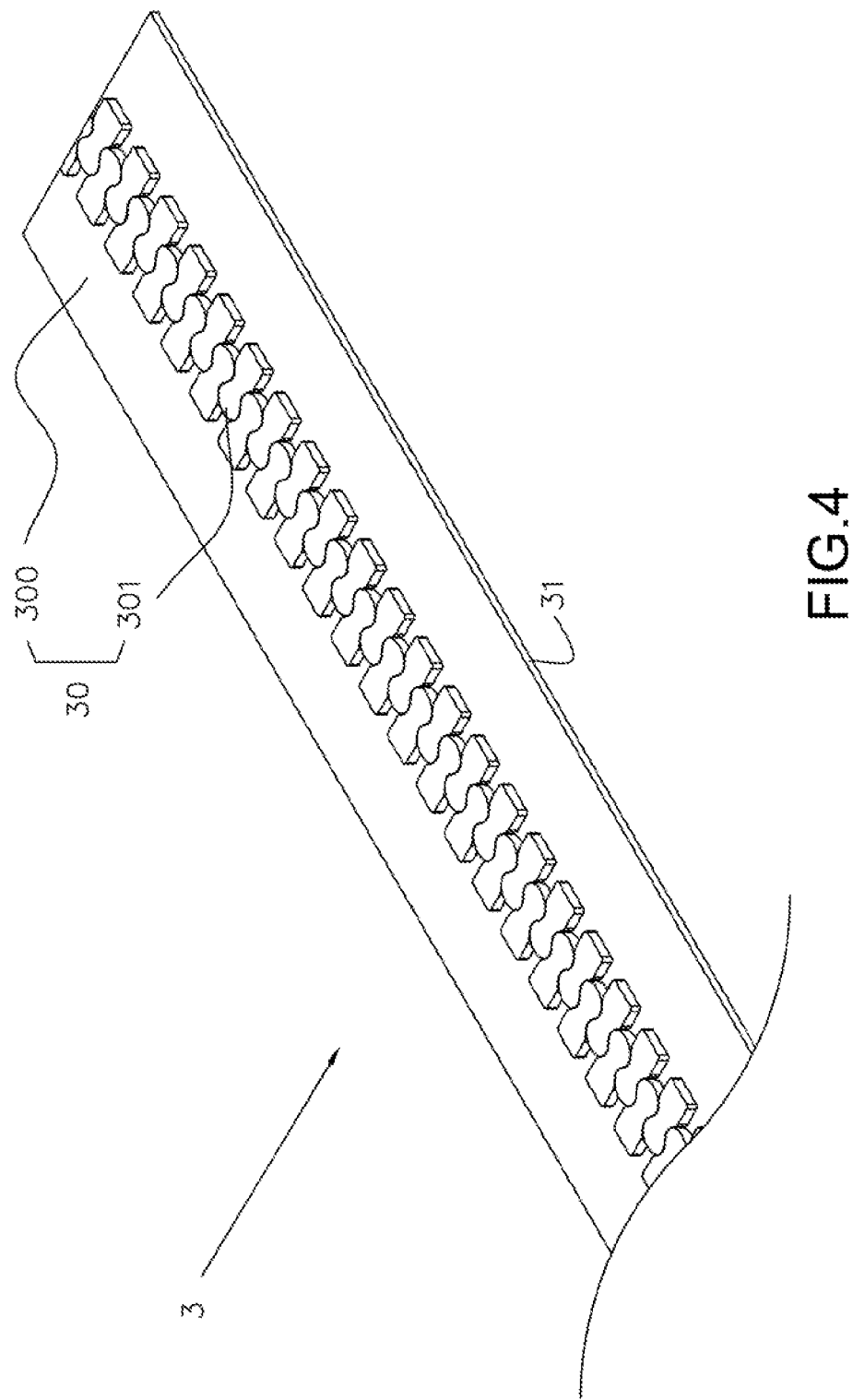
FIG. 4 is a perspective view of a waterproof zipper according to the invention.
Figure 5:
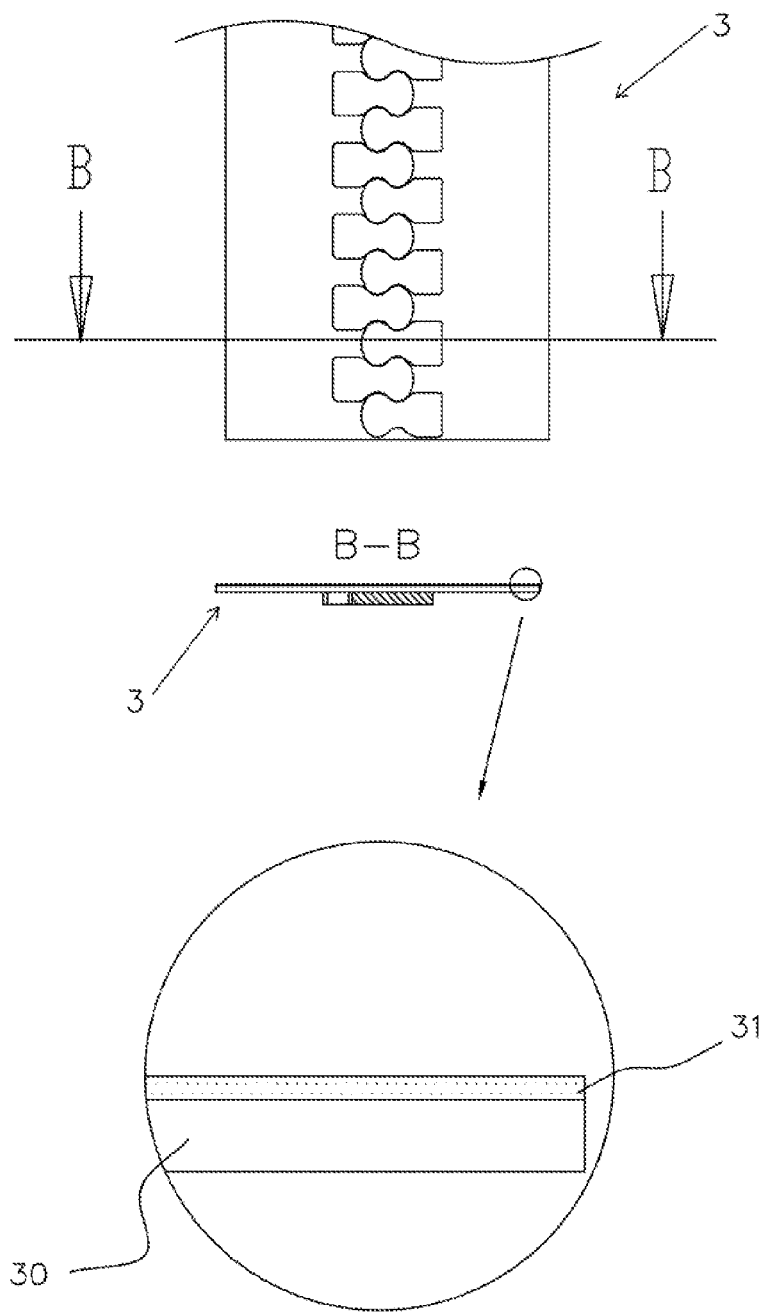
FIG. 5 is a sectional view of the waterproof zipper taken along line B-B of FIG. 4.

Referring to FIGS. 4 and 5, a waterproof zipper 3 in accordance with the invention comprises the following components as discussed in detail below.

Two halves 30, each includes a half tape member 300 and a row of protruding teeth 301 along an inner edge of the half tape member 300. A waterproof layer 31 is secured to an inner surface of the halves 30 for preventing water from passing through the halves 30.

The waterproof layer 31 comprises 10% to 21% by weight of dimethylacetamide, 30% to 41% of methyl ethyl ketone, 4% to 12% of toluene, 1% to 7% of N-methyl-2-pyrrolidone, and 36% to 47% of polyurethane resin.

Figure 6:
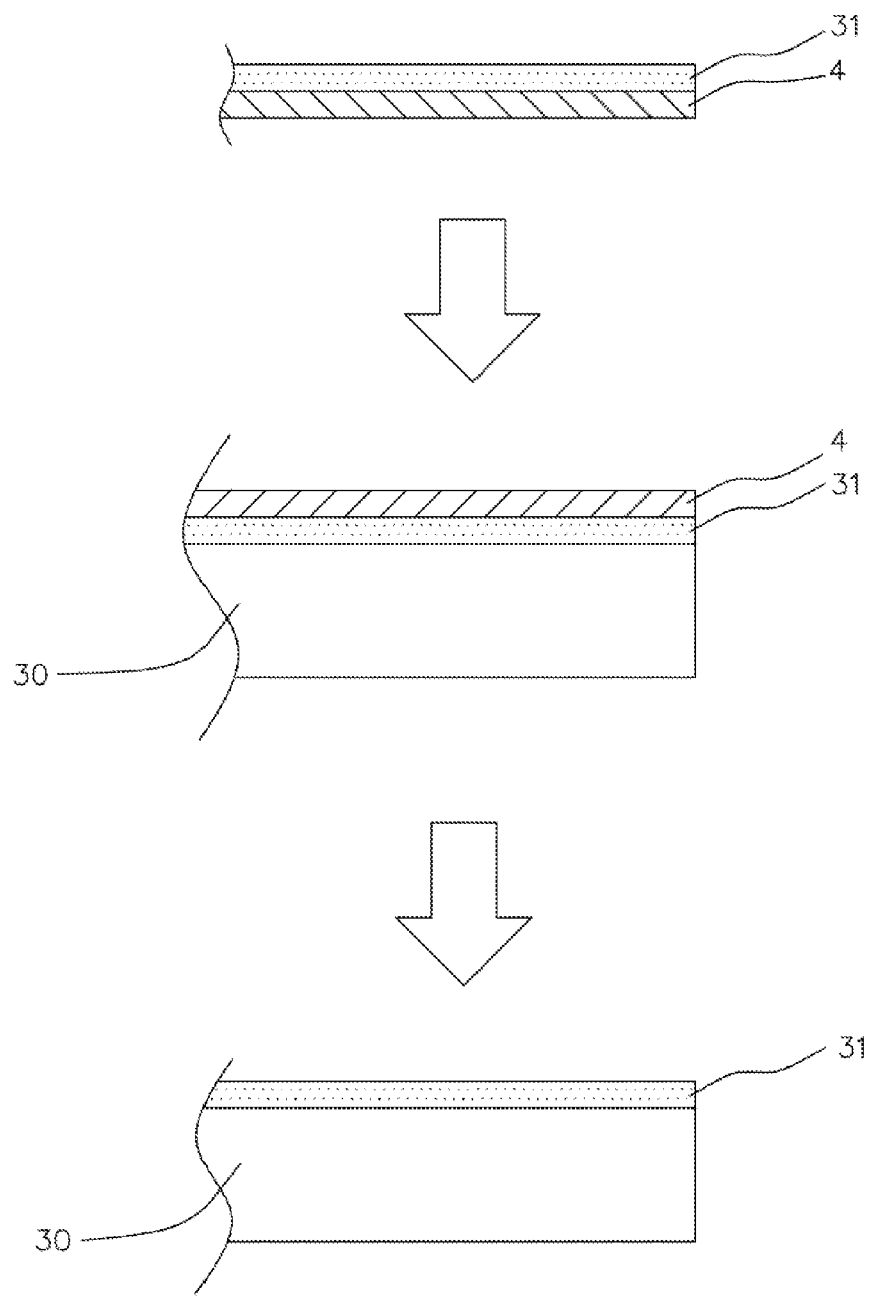
FIG. 6 schematically depicts a process of manufacturing the waterproof zipper according to the invention.

Referring to FIG. 6 in conjunction with FIGS. 4 and 5, a process of manufacturing the waterproof zipper in accordance with the invention is illustrated. The process comprises the following steps:

Guiding the waterproof layer 31 to a position above two halves 30 on a continuous flow production line, each half 30 having a half tape member 300 and a row of protruding teeth 301 along an inner edge of the half tape member 300.

Uniformly coating the waterproof layer 31 on a releasing layer 4.

Drying both the waterproof layer 31 and the releasing layer 4 in an oven.

Pressing the halves 30 on the waterproof layer 31 at a pressure range from 10 kg/cm² to 30 kg/cm² by means of a pressing device in a temperature range from 40° C. and 140° C. to secure the waterproof layer 31 and the releasing layer 4 together.

Removing the releasing layer 4 from the waterproof layer 31, i.e., only the waterproof layer 31 secured to the halves 30.

Drying both the waterproof layer 31 and the halves 30 in the oven again.

Cooling both the waterproof layer 31 and the halves 30, removing same from the continuous flow production line, and placing same in a room environment for five to seven days. As a result, a complete zipper is finished.

The invention has the following advantages: Electroplating step is eliminated. Manufacturing process is simplified. Thickness of the zipper is relatively low. The zipper is sufficiently flexible.

While the invention has been described in terms of preferred embodiments, those skilled in the art will recognize that the invention can be practiced with modifications within the spirit and scope of the appended claims.

What is claimed is:

1. A waterproof zipper comprising:
   two halves, each including a half tape member and a row of protruding teeth along an inner edge of the half tape member; and
   a waterproof layer is secured to an inner surface of the halves,
   wherein the waterproof layer comprises 10% to 21% by weight of dimethylacetamide, 30% to 41% of methyl ethyl ketone, 4% to 12% of toluene, 1% to 7% of N-methyl-2-pyrrolidone, and 36% to 47% of polyurethane resin.

2. A method for manufacturing a waterproof zipper, comprising the steps of:
   (a) guiding a waterproof layer to a position above two halves on a continuous flow production line, each half having a half tape member and a row of protruding teeth along an inner edge of the half tape member;
   (b) coating a waterproof layer on a releasing layer;
   (c) drying both the waterproof layer and the releasing layer in an oven;
   (d) pressing the halves on the waterproof layer at a pressure range from 10 kg/cm² to 30 kg/cm² by means of a pressing device in a temperature range from 40° C. and 140° C. to secure the waterproof layer and the releasing layer together;
   (e) removing the releasing layer from the waterproof layer;
   (f) drying both the waterproof layer and the halves in the oven again;
   (g) cooling both the waterproof layer and the halves for a predetermined period of time;
   (h) removing both the waterproof layer and the halves from the continuous flow production line; and
   (i) placing both the waterproof layer and the halves in an environment for five to seven days to produce a finished waterproof zipper,
   wherein the waterproof layer comprises 10% to 21% by weight of dimethylacetamide, 30% to 41% of methyl ethyl ketone, 4% to 12% of toluene, 1% to 7% of N-methyl-2-pyrrolidone, and 36% to 47% of polyurethane resin.

* * * * *